United States Patent
Choi

(10) Patent No.: US 9,037,851 B2
(45) Date of Patent: *May 19, 2015

(54) USER AUTHENTICATION SYSTEM, USER AUTHENTICATION APPARATUS, SMART CARD, AND USER AUTHENTICATION METHOD FOR UBIQUITOUS AUTHENTICATION MANAGEMENT

(76) Inventor: Unho Choi, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/510,464

(22) PCT Filed: Sep. 30, 2010

(86) PCT No.: PCT/KR2010/006698
§ 371 (c)(1),
(2), (4) Date: May 17, 2012

(87) PCT Pub. No.: WO2011/062364
PCT Pub. Date: May 26, 2011

(65) Prior Publication Data
US 2012/0278614 A1    Nov. 1, 2012

(30) Foreign Application Priority Data
Nov. 17, 2009  (KR) .................... 10-2009-0110964

(51) Int. Cl.
*H04L 9/32*    (2006.01)
*H04W 12/06*  (2009.01)
(Continued)

(52) U.S. Cl.
CPC .............. *H04W 12/06* (2013.01); *G06F 21/32* (2013.01); *H04L 63/0272* (2013.01);
(Continued)

(58) Field of Classification Search
CPC ................... G06F 21/31–21/33; G06F 21/64; H04L 9/3263; H04L 29/06775; H04L 9/006
See application file for complete search history.

(56) References Cited

U.S. PATENT DOCUMENTS 7,272,723 B1 *   9/2007  Abbott et al. .................. 713/185
2008/0045342 A1 *  2/2008  Crowder et al. ................ 463/42

FOREIGN PATENT DOCUMENTS

JP     2008269511 A     11/2008
KR    10-2003-0000942     1/2003
(Continued)

OTHER PUBLICATIONS

How to Support Smart Card Logon for Remote Access VPN Connections. TechNet. Aug. 29, 2006.*
(Continued)

*Primary Examiner* — Venkat Perungavoor
(74) *Attorney, Agent, or Firm* — Harness, Dickey & Pierce, P.L.C.

(57) ABSTRACT

A user authorization system for authorization management is disclosed. The user authorization system includes a public key infrastructure (PKI) certificate issuing server that issues a PKI certificate including a subscriber's biometric signature. The system also includes a sensing means that recognizes biometric patterns. The system also includes a smart card that stores the subscriber's biometric signature and the PKI certificate and verifies the user. The user authorization system also includes a terminal configured to establish a virtual private network (VPN) between the smart card and the service server in response to a tunneling start signal received from the smart card. The smart card transmits the tunneling start signal to the terminal if the user's biometric pattern matches with the subscriber's biometric signature and transmits authorization information derived from the PKI certificate to the service server through the VPN.

14 Claims, 4 Drawing Sheets

(51) Int. Cl.
*G06F 21/32* (2013.01)
*H04L 29/06* (2006.01)
*H04L 9/00* (2006.01)
*H04L 29/12* (2006.01)

(52) U.S. Cl.
CPC ............ *H04L 9/006* (2013.01); *H04L 9/3231* (2013.01); *H04L 9/3247* (2013.01); *H04L 2209/56* (2013.01); *H04L 2209/76* (2013.01); *H04L 2209/805* (2013.01)

(56) References Cited

FOREIGN PATENT DOCUMENTS

| KR | 1020050051221 A | 6/2005 |
|---|---|---|
| KR | 10-2006-0060236 | 6/2006 |
| KR | 10-2006-0117631 | 11/2006 |
| KR | 1020070038308 A | 4/2007 |
| KR | 1020080036446 A | 4/2008 |
| KR | 10-2008-0113333 | 12/2008 |

OTHER PUBLICATIONS

The OpenVPN Smartcard HowTo. Acksyn. Apr. 7, 2007.*
SANS Biometric Selection: Body Parts Online. Walker. Jul. 26, 2002.*
HIPAA Compliance and SmartCards Solutions to Privacy and Security Requirements. SmartCard Alliance. Sep. 2003.*
Biometrics authentication with smartcard. Bechelli et al. eTeleomatica(2002).*
International Search Report for PCT/KR2010/006699 (in Korean and English), mailed Jun. 3, 2011; ISA/KR.
International Search Report in Korean (with English Translation) for PCT/KR2010/006698, mailed Jun. 23, 2011; ISA/KR.

* cited by examiner

USER AUTHENTICATION SYSTEM, USER AUTHENTICATION APPARATUS, SMART CARD, AND USER AUTHENTICATION METHOD FOR UBIQUITOUS AUTHENTICATION MANAGEMENT

CROSS-REFERENCE TO RELATED APPLICATIONS

This is a 371 national phase application of PCT/KR2010/006698 filed Sep. 30, 2010 that claims priority 35 U.S.C §119(a) to Korean Patent Application No. 10-2009-0110964 filed Nov. 17, 2009 , the entire contents both of which are incorporated herein by reference.

TECHNICAL FIELD

The present disclosure relates to a user authentication system, a user authentication apparatus, a smart card, and a user authentication method for ubiquitous authentication management, and more particularly to a user authentication system, a user authentication apparatus, a smart card, and a user authentication method for ubiquitous authentication management, which provide more strengthened service authorization function by authenticating the user primarily using a biometric signature and secondly using a PKI (public key infrastructure) certificate.

BACKGROUND

These days, information protection for administration systems of corporations or governmental organizations has been emphasized. Various kinds of information protection systems for reinforcing the security of the administration system have been employed. Nevertheless, accidents in information protection have been occurring.

Conventional information protection system, for any terminal of a user trying to access the administration system, provides information protection service for the administration system by controlling the access using log information or network information of the terminal and by monitoring use information on the administration system of the terminal even after the access is allowed.

In the conventional information protection system, however there is a problem that an illegal user may access to the administration system without any trouble using a legitimate terminal, in situation where the illegal user has knowledge of personal information of a legitimate user.

Meanwhile, a user has to install a virtual private network module or information protection module in the terminal in case where the legitimate users such as corporate employees or government officials in remote place try to access to the administration system and the administration system of corporations or governmental organizations is constructed based on virtual private network.

Meanwhile, there is no need to authenticate a user for commonly used credit cards or transportation cards when using the cards, and therefore illegal use is relatively easy if an illegitimate user obtains simple personal information or card information of the user. Therefore, there is a problem that a person who illegally acquired a credit card or a transportation card can use the card freely without any limitation in an illegal way of e.g., duplicating it at home or abroad once the person finds out simple personal information or card information of the legitimate user.

Additionally, in transactions such as an internet banking or an electronic bidding, there is a problem that the informations can be used in illegal withdrawals, illegal bidding, illegal e-commerce, etc., upon obtaining the information of a PKI (public key infrastructure) certificate or a security card.

DISCLOSURE

Technical Problem

Therefore, to solve the above-mentioned problems, the present disclosure seeks to receive user authentication conveniently at any time and at anywhere in case the user wants to receive the service by connecting to the service server through the network, and to provide more strengthened a user authentication system, a user authentication apparatus, a smart card, and a user authentication method for ubiquitous authorization management.

The present disclosure seek to provide a user authentication apparatus such as a biometric smart card or a USB type information protection token for providing more improved service authentication function so that illegitimate users cannot use the card of the legitimate user, even an illegitimate knows the simple personal information or card information of the legitimate user.

SUMMARY

An embodiment of the present disclosure provides a user authorization system for ubiquitous authorization management comprises: a PKI (public key infrastructure) certificate issuing server for issuing a PKI (public key infrastructure) certificate matching a biometric signature of a registered subscriber; a smart card for storing the biometric signature of the subscriber and the PKI (public key infrastructure) certificate issued by the PKI (public key infrastructure) certificate issuing server, comparing a biometric signature inputted from a user with the stored biometric signature of the subscriber, and generating a tunneling start signal in case the inputted biometric signature matches the stored biometric signature; a service server for providing various services for the authorized user on the basis of the PKI (public key infrastructure) certificate issued by the PKI (public key infrastructure) certificate issuing server; and a terminal, connected to the smart card in a wired or a wireless communication method, for establishing a virtual private network (VPN) between the smart card and the service server in correspondence with the tunneling start signal received from the smart card, and transmitting an authorization information based on the PKI (public key infrastructure) certificate to the service server through the VPN.

The user authorization system further comprises a log data storage server for recording and storing a log data of the smart card through the service server and an authorization result thereof.

Another embodiment of the present disclosure provides a user authorization apparatus for ubiquitous authorization management comprising: a smart card for storing a biometric signature of a registered subscriber and a PKI (public key infrastructure) certificate matching the biometric signature of the registered subscriber, comparing a biometric signature inputted from a user with the stored biometric signature of the subscriber, and generating a tunneling start signal in case the inputted biometric signature matches the stored biometric signature of the subscriber; and a terminal, connected to the smart card in a wired or wireless way, for establishing a virtual private network (VPN) between information the smart card and a uniform resource locator (URL) in correspondence to a tunneling start signal received from the smart card, and transmitting an authorization information based on the PKI (public key infrastructure) certificate to the URL through the established VPN.

The terminal is connected to a network in the wired or wireless way.

The terminal comprises a computer, a dongle for connecting to a wired or wireless communication terminal including a mobile communication terminal, and a USB type information protection token.

Additional embodiment of the present disclosure provides a smart card comprising: a biometric signature scan and input section for receiving a biometric signature from a user; a biometric signature storage section for storing the biometric signature of a registered subscriber; a PKI (public key infrastructure) certificate storage section; a biometric signature matching section for comparing the biometric signature inputted from the biometric signature scan and input section with the biometric signature stored in the biometric signature storage section to determine whether the two biometric signatures match or not, when the PKI (public key infrastructure) certificate for storing in the PKI (public key infrastructure) certificate storage section is received; and a PKI (public key infrastructure) certificate storage control section for storing the PKI (public key infrastructure) certificate in the PKI (public key infrastructure) certificate storage section, when the received biometric signature matches the stored biometric signature and an information matching the biometric signature of the user is included in the PKI (public key infrastructure) certificate.

The biometric signature comprises at least any one of fingerprint signature, vascular pattern information, voice pattern information, iris pattern information, and palm pattern information.

The smart card further comprises a signal transmission section for transmitting a tunneling start signal to establish a communication tunnel to a target terminal, when it is determined that the inputted biometric signature matches the stored biometric signature.

The smart card further comprises an authorization execution section for authorizing the user by transmitting, to the target terminal, the authorization information based on the PKI (public key infrastructure) certificate stored in the PKI (public key infrastructure) certificate storage section.

The smart card further comprises a one-time password (OTP) generation section for generating a one-time password (OTP) in a predetermined manner, and the authorization execution section transmits at least one of the OTPs generated from the OTP generation section after associating the authorization information.

The biometric signature storage section stores fingerprint signature for a plurality of fingerprints of registered subscribers; and the signal transmission section transmits the tunneling start signal to a different target server depending on the fingerprint signature matching the fingerprint signature received from the user among the stored plurality of fingerprint signatures.

The signal transmission section transmits the authorization information after associating a code for authorizing the user and a transmission time information of the authorization information.

Further embodiment of the present disclosure provides a smart card comprising: a biometric signature scan and input section for receiving a biometric signature from a user; a biometric signature storage section for storing a biometric signature of a registered subscriber; a PKI (public key infrastructure) certificate storage section for storing a PKI (public key infrastructure) certificate; a signal transmission section for transmitting a tunneling start signal to establish a communication tunnel to a target terminal, when it is determined that a biometric signature received through the biometric signature scan and input section by the user matches the stored biometric signature; and an authorization execution section for authorizing the user by transmitting the authorization information to the target terminal, when the target terminal and the communication tunnel are established.

A user authorization method for ubiquitous authentication management, the method comprising: receiving and storing a subscriber biometric signature registered in an authorization organization and a PKI (public key infrastructure) certificate matching the biometric signature of the subscriber; comparing a biometric signature received from a user with the stored biometric signature of the subscriber; transmitting a tunneling start signal to establish a communication tunnel to a target terminal when the inputted biometric signature matches the stored biometric signature; and transmitting, to the target terminal, the authorization information based on the stored PKI (public key infrastructure) certificate when the communication tunnel is established to the target terminal.

The authorization method further comprises a step of recording and storing a log data of the smart card and an authorization result thereof.

The fingerprint signature for the plurality of fingerprints of the subscribers are stored in the storing step, and the tunneling start signal is transmitted to a different target terminal depending on the matching result of the fingerprint signature inputted from the user and the stored plurality of fingerprint signature in the transmission step.

Advantageous Effects

According to the present disclosure as described above, even though a stranger knows simple information of a legitimate user such as personal information, card information, or PKI (public key infrastructure) certificate information, the user authorization apparatus such as a USB or an information protection token is provided to achieve an enhanced service authorization function so that a stranger cannot use the card of the legitimate user.

Additionally, according to the present disclosure, when a user in a remote place wishes to do a remote work by accessing to an intra-net system established on a virtual private network, it is advantageous to enhance the information protection on the remote access of the intra-net system by providing more intensified service authorization through user authorization apparatus that the user carries with or is installed in e.g. computer, IPTV setup box, CD/ATM, KIOSK, and cellular phone.

According to the present disclosure, when a user in a remote place wishes to do a remote work by accessing to the administration system established on a virtual private network, the user may perform the service authorization for the user and a virtual private network module through a portable user authorization apparatus installed in the terminal of the user. Accordingly, the user can access to business system conveniently with any terminal from any place and do various kinds of work such as internet banking, electronic payment, electronic commerce, home shopping, and electronic bidding, as long as the user authorization apparatus or the user authorization apparatus that is carried by the user and is installed in advance in a computer, IPTV setup box, CD/ATM, KIOSK, cellular phone, and etc.

Additionally, according to the present disclosure, once the user in remote distance is authorized with the service authorization through a user authorization apparatus, the user may use various information protection-related services of the administration system in the environment of doing work by accessing to the administration system established by the virtual private network.

Additionally, according to the present disclosure, the work or task of each person in charge can be clearly verified by applying the present invention to an accounting system, an electronic approval system, and a government/public sector, and therefore the official duties can become transparent through prevention of forged/falsified signature of the PKI (public key infrastructure) certificate.

DETAILED DESCRIPTION

Figure 1:
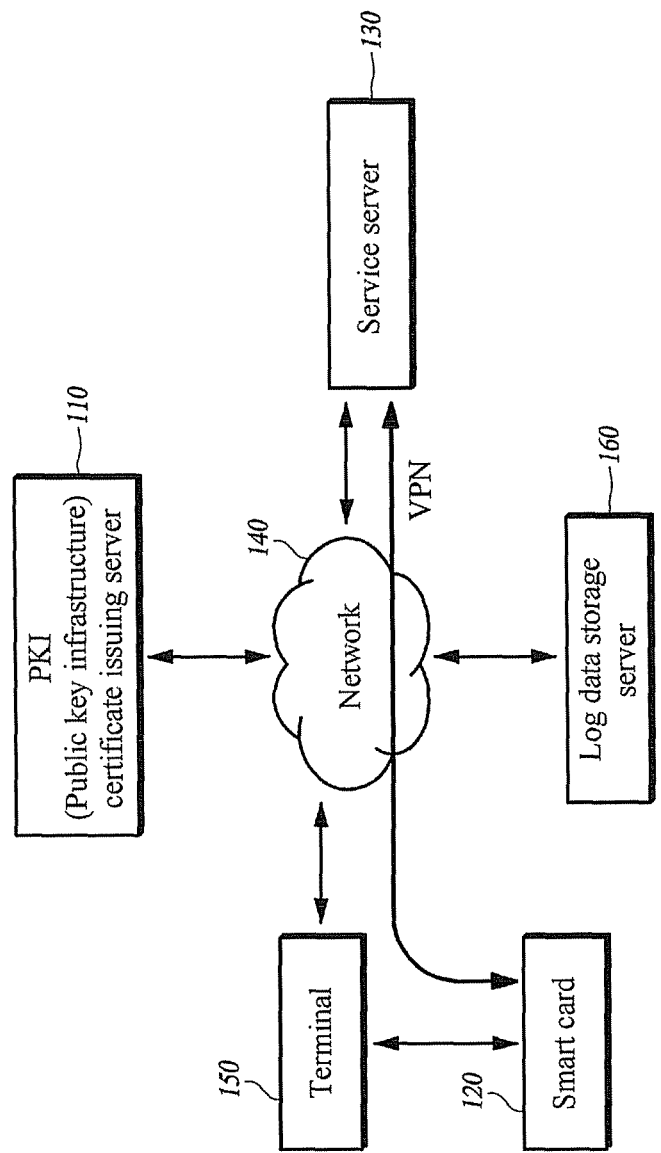
FIG. 1 is a view schematically illustrating a user authentication system for a ubiquitous authentication management according to a preferred embodiment of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a schematic diagram of a user authorization system for a ubiquitous authorization management in accordance with an embodiment of the present invention.

Figure 2:
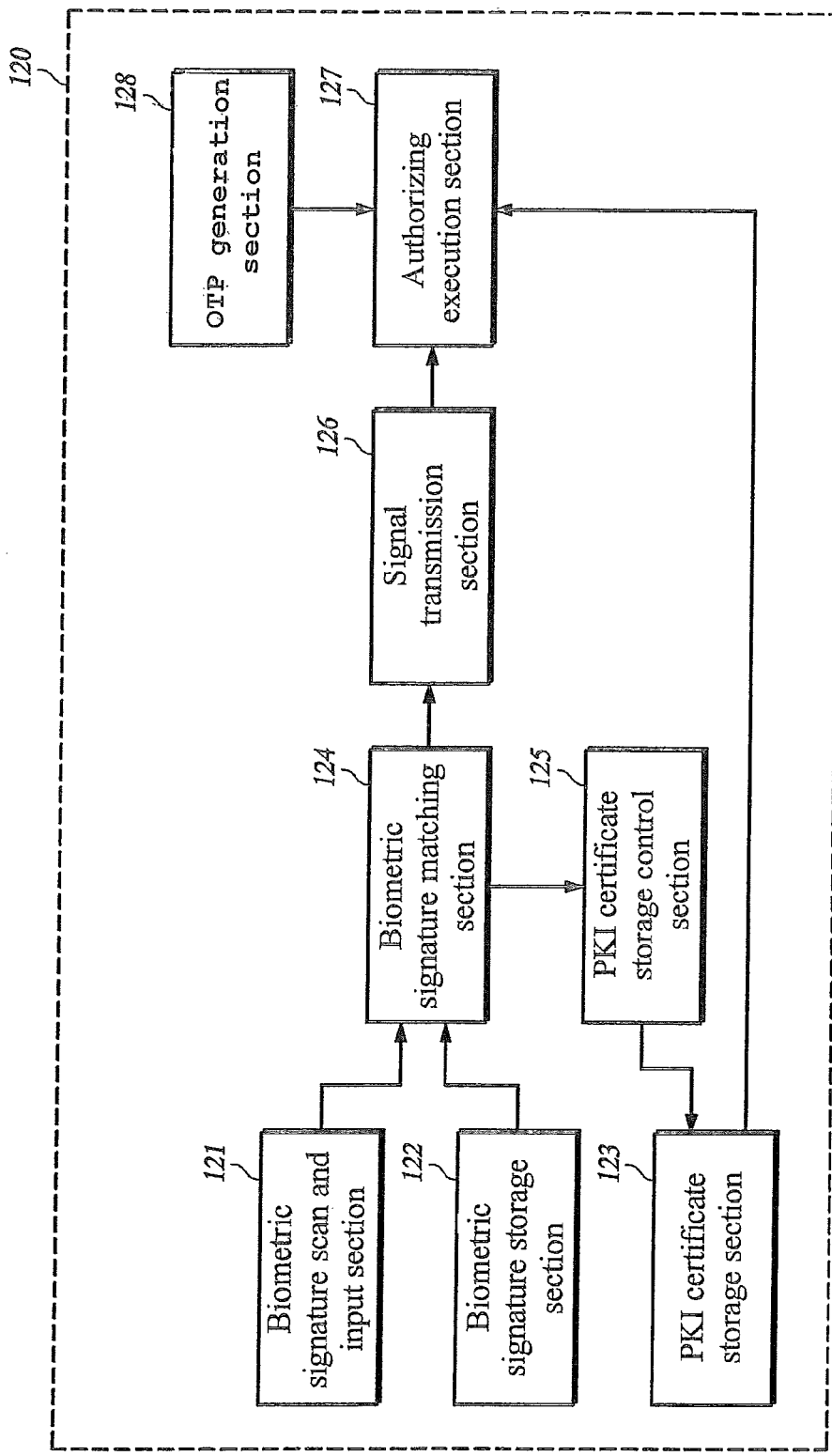
FIG. 2 is a view schematically illustrating a smart card used in a user authentication system shown in FIG. 1 according to a preferred embodiment of the present disclosure.

Referring to FIG. 1, a ubiquitous authentication management system 100 in accordance with a preferred embodiment of the present invention comprises a PKI (public key infrastructure) certificate issuing server 110, a smart card 120, a service server 130, a network 140, a terminal 150, and a log data storage server 160. The card for authorizing biometric may be implemented with the smart card 102 to compare a digital certificate with the authenticated biometric signature and the registered biometric signature and other information can be stored in a biometric device, IC chip, or the storage space of a card. The smart card 120, as illustrated in FIG. 2, comprises a biometric signature scan and input section 121, a biometric signature storage section 122, a PKI (public key infrastructure) certificate storage section 123, a biometric signature matching section 124, a PKI (public key infrastructure) certificate storage control section 125, a signal transmission section 126, an authorization execution section 127, and a one-time password (OTP) generation section 128. The PKI (public key infrastructure) certificate is a sort of an electronic guarantee with which a business partner can be trusted when doing business on the web, issued from a certain certificate authority, and comprises user name of the PKI (public key infrastructure) certificate, validity, a public key to confirm digital signature of the user, and a digital signature of the certificate authority who certifies authenticity.

The PKI (public key infrastructure) certificate issuing server 110 issues a PKI (public key infrastructure) certificate matching the biometric signature of a registered subscriber. Namely, when a user becomes a subscriber and registers his or her biometric signature to be issued a PKI (public key infrastructure) certificate, the PKI (public key infrastructure) certificate issuing server 110 generates and issues the PKI (public key infrastructure) certificate matching the registered biometric signature. In this case, the PKI (public key infrastructure) certificate issuing server 110 can encode the registered biometric signature and inserts it into the PKI (public key infrastructure) certificate. The PKI (public key infrastructure) certificate issuing server 110 comprises at least one of fingerprint signature, vascular pattern information, voice pattern information, iris pattern information, palm pattern information, etc.

The biometric signature scan and input section 121 receives the biometric signature of the owner or user of the biometric authentication card 120. Here, the biometric signature scan and input section 121 may be implemented as a fingerprint recognition sensor, an iris recognition sensor, a voice recognition sensor, a vascular recognition sensor, and a palm recognition sensor.

The biometric signature storage section 122 stores the biometric signature of the subscribers registered in the PKI (public key infrastructure) certificate issuing server 110. In this case, the biometric signature storage section 122 stores the biometric signature responding to the kind of a sensor of the biometric signature scan and input section 121. That is, when the biometric signature scan and input section 121 is implemented as the fingerprint scan sensor, the biometric signature storage section 122 stores the fingerprint signature of the registered subscriber as the biometric signature, and stores the iris pattern information of the registered subscriber as the biometric signature when the biometric signature scan and input section 121 is implemented as the iris scan sensor. The storage location of the biometric signature may be a separated device or an IC chip, wherein the present invention is not limited to it.

The biometric signature storage section 122 may store a plurality of biometric signatures for a registered subscriber. For example, in case of storing the fingerprint signature of a registered subscriber as the biometric signature, the fingerprint signature of each finger may be stored, and as storing the iris pattern information of the registered subscriber as the biometric signature, the iris pattern information of both eyes may be stored.

The PKI (public key infrastructure) certificate storage section 122 may store a PKI (public key infrastructure) certificate which is issued by the PKI (public key infrastructure) certificate issuing server 110. In this case, it is preferably implemented that only an organization issuing the smart card 120 can store the PKI (public key infrastructure) certificate in the PKI (public key infrastructure) certificate storage section 123. Likewise, the user can access to the PKI (public key infrastructure) certificate issuing server 110 through the network 140, and store the PKI (public key infrastructure) certificate in the PKI (public key infrastructure) certificate storage section 123, or take a copy of the PKI (public key infrastructure) certificate from a personal computer and store it in the PKI (public key infrastructure) certificate storage section 123.

The biometric signature matching section 124 checks whether the biometric signature inputted by the biometric signature scan and input section 121 matches the biometric signature stored in the biometric signature storage section 122. Namely, it is checked whether the biometric signature of the smart card user matches the biometric signature of the user registered in the PKI (public key infrastructure) certificate issuing server 121.

When the PKI (public key infrastructure) certificate storage control section 125 receives a PKI (public key infrastructure) certificate to be stored in a PKI (public key infrastructure) certificate storage section 123, it determines whether the information matching the biometric signature of the user is included in the PKI (public key infrastructure) certificate, only if the biometric signature of the user inputted by the biometric signature scan and input section 121 matches the biometric signature stored in the biometric signature storage section 122. The PKI (public key infrastructure) certificate storage control section 125 stores the received PKI (public key infrastructure) certificate in the PKI (public key infrastructure) certificate storage section 123, only when it is determined that the received PKI (public key infrastructure) certificate includes the information matching the biometric signature of the user. Therefore, the PKI (public key infrastructure) certificate storage control section 125 primarily allows only the legitimate users or owner of the smart card 120 to store the PKI (public key infrastructure) certificate in the PKI (public key infrastructure) certificate storage section 123. The PKI (public key infrastructure) certificate stored in the PKI (public key infrastructure) certificate storage section 123 secondly may be implemented to limit only to the PKI (public key infrastructure) certificate including the information matching the biometric signature for the legitimate users. But, such PKI (public key infrastructure) certificate storage process is to intensify the authentication procedure by the smart card 120, and in some case, it may be implemented to store the corresponding PKI (public key infrastructure) certificate even though it carries no information that matches the biometric signature of the user.

The signal transmission section 126 transmits a tunneling start signal to establish a target terminal communication tunnel when it is determined that the biometric signature inputted by the biometric signature scan and input section 121 matches the biometric signature stored in the biometric signature storage section 122. Herein, the target terminal can be a terminal 150 which directly connects to the smart card 120 in a wired or a wireless way, or can be the service server 130 or the terminal 150 which is connected through the network 140. If the target terminal is the service server 130 or the terminal 150 which is connected through the network 140, then the location of the target terminal on the network 140 may be set up as a URL(Uniform Resource Locator), and the communication tunneling may be established by establishing a VPN(Virtual Private Network) with a prescribed URL.

Where a plurality of biometric signatures on the registered subscribers are stored in the biometric signature storage section 122, the signal transmission section 126 may be implemented to transmit the tunneling start signal to different target terminals in accordance with the biometric signature matching the biometric signature inputted through the biometric signature scan and input section 121. For example, when the fingerprint signature on a plurality of the fingers of a subscriber registered in the biometric signature storage section 122 is stored as the biometric signature, then the communication tunnel is established as a safety management server such as a police server by one of any fingerprint signature, and the emergency signal is transmitted to the server. Accordingly, it is implemented to file a report with the fingerprint signature when it is a case for the user to execute the authorization process using the smart card 120 forcefully at the threat of a stranger.

The authorizing execution section 217, when the communication tunnel is established up to the target terminal, transmits the authorization information based on the PKI (public key infrastructure) certificate stored in the PKI (public key infrastructure) certificate storage section 123 to the corresponding target terminal, and processes the authorization process that the user of the smart card 120 is a legitimate user.

The one-time password (OTP) generation section 128 generates the OTP in a way determined by the issuance entity of the smart card 120. In this case, the OTP generated by the one-time password (OTP) generation section 128 is displayed so that the user of the smart card 120 can view, and the authorizing execution section 127 can be implemented to transmit the authorization information to the target terminal after passing through the authorization process for the user of the smart card 120 one more time through the OTP inputted by the user. Alternatively, the OTP generated by the one-time password (OTP) generation section 128 cannot be viewed by the user of the smart card 120, and the authorizing execution section 127 may combine the OTP generated by the one-time password (OTP) generation section 128 with the authorization information and transmits the combined one to the target terminal, so that it can be implemented to ensure that the corresponding smart card 120 is issued by a lawful issuance organization.

The service server 130 provides various services to the authorized user based on the PKI (public key infrastructure) certificate issued by the PKI (public key infrastructure) certificate issuing server 110. Herein, the service server 130 has a URL on the network 140, authorizes the user by receiving authorization information from the smart card 120 through the network 140, provides content to the authenticated user through the network 140, and provides services such as home-shopping service using IPTV, offline product sale, rental, account transfer, payment. Namely, the service server 130 comprises various servers performing various services such as payment proxy for purchase of goods by the user, product or service provision, internet banking business.

The terminal 150, linked with the smart card 120 in a wired or wireless way, establishes virtual private network (VPN) between the smart card 120 and the service server 130, and receives the authorization information based on the PKI (public key infrastructure) certificate from the smart card 120 and transmits it to the service server 130. The authorization information which is to be sent to the service server 130 may include unique information for future use in proving the act of the user. Such unique information may be implemented in the form of a bar code or a user digital signature which can authorize the user time and the action of the user in an electronic way. Additionally such bar code or digital signature is preferably implemented to be printed into prints. Transmission time information may be included in the authorization information transmitted to service server 130. Thus, the authentication process using the smart card 120 can enhance the reliability of the mutual contract by printing on a receipt or statement as the form of user digital signature.

The log data storage server 160 records and stores the log data of the smart card 120 through the terminal 150 and the authorization thereof, and performs digital forensic function to perform digital forensic functions. In addition, if the service server 130 accesses to the certificate authority server and a card company server to check the information of the user again, the log data storage server 160 may record and store the attempt of the access and the result. The log data storage server 16 may monitor the VPN established between the smart card 120 and the service server 130, and act as a virtual private network (VPN) firewall for prohibiting the access by an unauthorized user.

Figure 3:
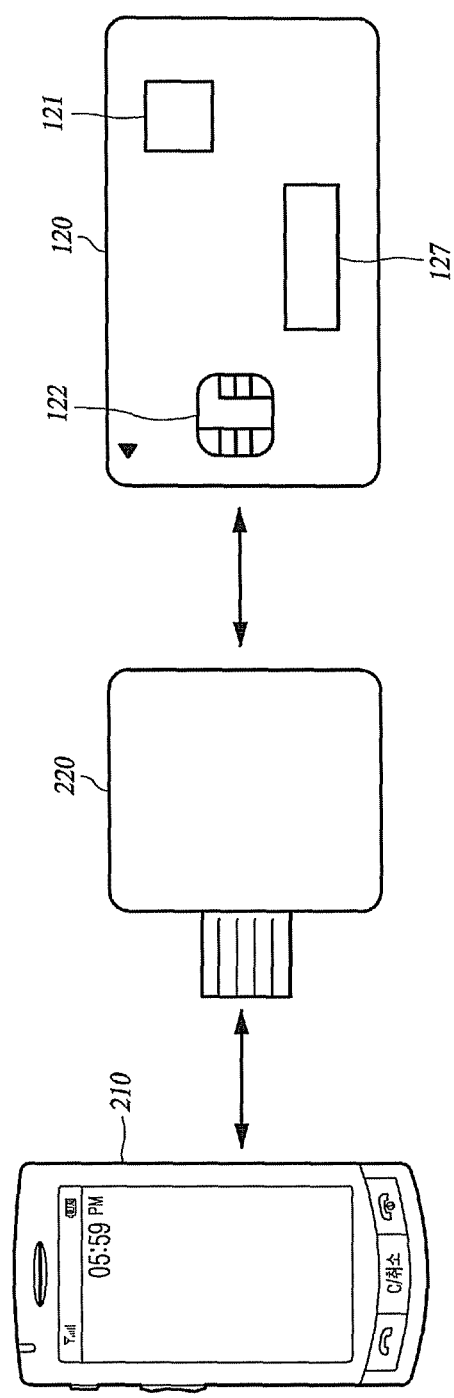
FIG. 3 is a view illustrating an example of connection between a smart card and a terminal shown in FIG. 2 according to a preferred embodiment of the present disclosure.

FIG. 3 is a view showing an example of the connection between the smart card and the terminal based on the embodiment of the present disclosure. As described above, the terminal 150 may be implemented as a mobile communication terminal. In this case, a dongle 220 equipped with a USB port can be provided to interface the connection between mobile communication terminal 210 and the smart card 120. It is preferable to equip the card recognition section (not shown) so that the dongle 220 can recognize the smart card 120 in an insertion or a contact manner.

Herein, as illustrated in Figures, the smart card 120 is implemented in the form of credit card, debit card, or transportation card, but the smart card 120 can be implemented as the dongle, and a USB type information protection token, etc.

As illustrated in the drawings, the terminal 150 is implemented as the mobile communication terminal 210 such as PDA, cell phone, and laptop, but the terminal 150 is not limited to them, and can be implemented as communication devices connected to the network through a wired communication like desktop, ATM (ATM: Automated Teller Machine), KIOSK as information delivery system, IPTV setup box, etc.

In addition, as illustrated in the drawings, the smart card 120 and the terminal 150 are separately configured, but it is not limited to this configuration. The smart card 120 and the terminal 150 may be combined to implement a single user authorization apparatus. Namely, the terminal 150 may comprises a biometric signature scan and input section 121 for receiving biometric signature of the user, and may be implemented to authenticate the user using the PKI (public key infrastructure) certificate matching the biometric signature of the user. In this case, the terminal 150 may be implemented to store the PKI (public key infrastructure) certificate matching the biometric signature of the user and to authenticate the user by using the PKI (public key infrastructure) certificate, and may also be implemented to authenticate the user by receiving the matching PKI (public key infrastructure) certificate from a computer or a USB memory.

Figure 4:
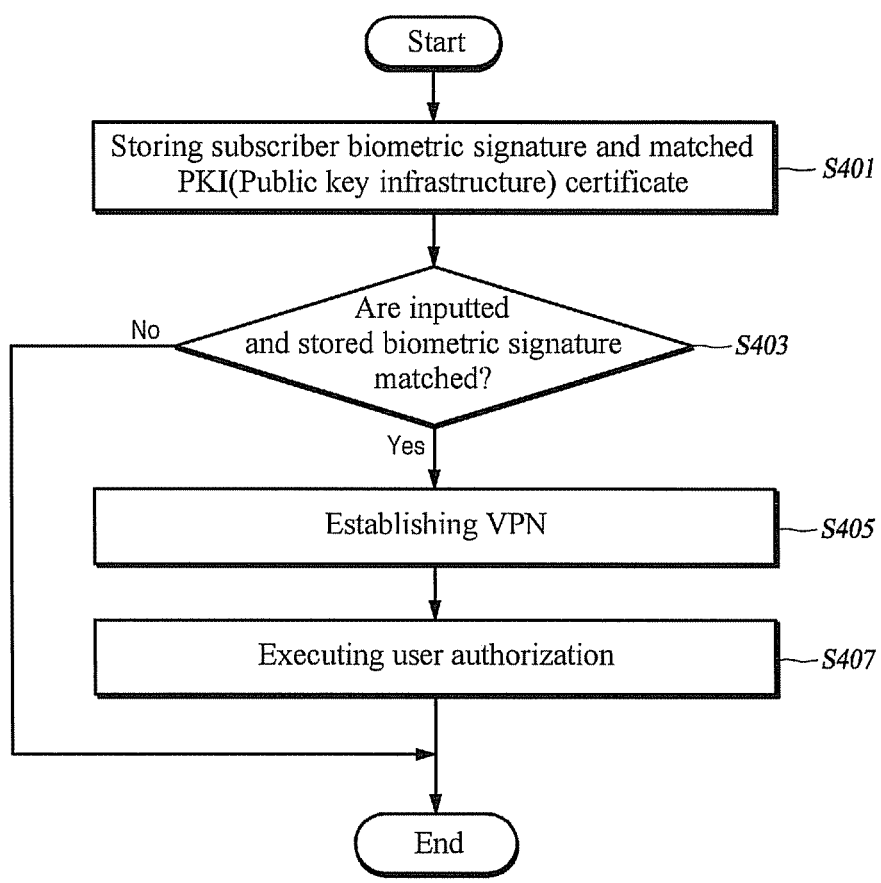
FIG. 4 is a flow chart illustrating a user authentication method according to a preferred embodiment of the present disclosure.

FIG. 4 is a flow chart showing a user authentication method for authenticating the user by using the smart card of FIG. 2. The user authentication method for ubiquitous authentication management according to the present disclosure will be now described in detail.

When a user registers for a smart card issuing organization such as bank, card company, and public organization to use the smart card 120, the PKI (public key infrastructure) certificate issuing server 110 of the smart card issuing organization registers user biometric signature as a subscriber information, then generates the PKI (public key infrastructure) certificate matching the registered biometric signature. At this point, the registered biometric signature is encoded and can be inserted into the generated PKI (public key infrastructure) certificate. The corresponding smart card issuing organization stores the biometric signature of the registered subscriber in the biometric signature storage section 122 of the smart card 120, and stores the PKI (public key infrastructure) certificated generated by the PKI (public key infrastructure) certificate issuing server 110 in the PKI (public key infrastructure) certificate storage section 123 and issues it to the user (S401). At this time, a plurality of biometric signatures of the subscriber can be stored in the biometric signature storage section 122. For example, when storing the fingerprint signature of a registered subscriber as the biometric signature, the fingerprint signature of a plurality fingers can be stored as the biometric signature.

The user may access to the PKI (public key infrastructure) certificate issuing server 110 again in the future to renew the PKI (public key infrastructure) certificate and store it. The PKI (public key infrastructure) certificate storage section 123 may also store other PKI (public key infrastructure) certificate issued by other PKI (public key infrastructure) certificate authenticity.

The terminal 150 sets a URL of service server for receiving a service. For example, when using mobile communication terminal 150 to access the server of a shopping center to purchase goods, corresponding shopping center server or payment proxy server becomes the service server 130, then the URL of the shopping center server or the payment proxy server can be set by the mobile communication terminal 150. When using the mobile communication terminal 150 to do internet banking, the server of the corresponding bank becomes the service server 130 and its URL may be set.

The user may engage the dongle 220 to the mobile communication terminal 150 to authorize the user using the smart card 120 and to pay for goods. When the user recognizes the biometric signature of her/his own through the biometric signature scan and input section 121, the biometric signature matching section 124 compares the recognized biometric signature with the stored biometric signature to determine whether the user is the legitimate smart card user or not (S403).

If the user is determined as the legitimate smart card user, the signal transmission section 125 transmits the tunneling start signal to establish the prescribed URL and the VPN. If a plurality of biometric signatures are stored in the biometric signature storage section 122, the signal transmission section 122 transmits different tunneling start signals corresponding to each biometric signature, at least one of tunneling start signal may be implemented to tunnel through the prescribed URL to inform the emergency of the user. For example, at least one of biometric signatures may be transmitted with the tunneling start signal to the police server (not shown) to inform the emergency of the user in case the user is threatened to use the smart card 120.

The mobile terminal 150 tunnels with the service server 130 to establish a virtual private network (VPN) in correspondence with the tunneling start signal received from the smart card 120 (S405). It can be implemented that such tunnel is monitored by the log data storage section 160, the log data through tunneling is recorded, and the access of an unauthorized user is blocked out.

The smart card 120 transmits the authorization information based on the PKI (public key infrastructure) certificate stored in the PKI (public key infrastructure) certificate storage section 123 through a tunnel established by the mobile communication terminal 150, and executes the authorization (S407).

As to the authorization information transmitted to the service server 130, the user authorization of the PKI (public key infrastructure) certificate may be performed by transmitting it along with the primarily authenticated biometric signature of the user instead of authorizing the user by receiving the password from the user.

The smart card 120 can combine authorization information with at least one of any one-time passwords (OTP) generated by OTP generation section 127, then transmit it to the service server 130. The OTP helps the service server 130 to authorize the user once more so that the user authorization using the smart card 120 is confirmed.

In addition, in case of using internet banking, etc. using the smart card 120, the process of entering user ID (identifier) for logging on the internet banking service server 130 can be replaced with the process of a establishing a communication tunnel based on the biometric signature of the user. Likewise, the process of entering a user password can be replaced with the process of transmitting the PKI (public key infrastructure) certificate through the communication tunnel. Moreover, the entering process of the PKI (public key infrastructure) certificate's password can be replaced with the process of comparing the biometric signature of the user with the matching information stored in the PKI (public key infrastructure) certificate. Thus, by performing tunneling and authorization execution using the smart card 120, the entry of password required by the corresponding service server 130 may be omitted, therefore so-called single-sign-on can be implemented, and the user authorization process becomes concrete.

Furthermore, by executing authorization using the biometric signature and/or the PKI (public key infrastructure) certificate of the smart card 120, it is easy for a user to access a desired site while on the move by using the mobile communication terminal and to enable a firm authorization.

The log data of the user authorization using the smart card 120 may be stored by the log data storage server 160. When the service server 130 checks the user again based on the OTP, then the log data storage section should also store the log data thereof.

Such log data can be used as the verification reference on the user's future. For example, the authorization information, provided to the service server 130, may include a signature information of the user. The signature information can be provided to an electronic receipt or a payment bill by being stored along with the log data.

Through this process, the log data stored in the log data storage section 160 can be used as an evidence in legal disputes involving the use of the smart card 120, and can be used to prevent any occurrence of other problems in the future.

According to a preferred embodiment of the present disclosure as described above, even if a stranger knows simple personal information, card information, and the PKI (public key infrastructure) certificate information of a certain user, the stranger cannot use the card of the legitimate user without permission, and therefore it can provide more secured authorization by providing double or triple check in authorizing the user.

According to a preferred embodiment of the present disclosure, the user, as long as holding the smart card, can conveniently access to service server anytime, anywhere in order to perform transactions regarding internet banking, electronic billing, electronic commerce, home shopping, e-bidding, etc.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. user authorization system for ubiquitous authorization management, comprising:
a public key infrastructure (PKI) certificate issuing server configured to issue a PKI certificate matching at least one biometric signature of a subscriber, wherein the PKI certificate includes at least one coded biometric information that is encoded from a subscriber's biometric information, the subscriber's biometric information includes at least two biometric patterns, one for an intended authorization of the subscriber and another for a forced authorization of the subscriber;
a sensing means for recognizing a biometric pattern from a user;
a smart card configured to store the at least one biometric signature and the PKI certificate and verify the user by comparing the user's biometric pattern with the at least one biometric signature, wherein the at least one biometric signature contains the subscriber's biometric information encrypted based on the PKI certificate;
a service server configured to identify, authenticate and authorize the smart card based on an authorization information derived from the PKI certificate, wherein the authorization information includes the subscriber's coded biometric information; and
a terminal, connected to the smart card by way of a wired or a wireless communication, configured to establish a virtual private network (VPN) between the smart card and the service server in response to a tunneling start signal received from the smart card,
wherein the smart card is further configured to transmit the tunneling start signal to the terminal if the user's biometric pattern matches with the at least one biometric signature, and to transmit an authorization information derived from the PKI certificate to the service server through the VPN.

2. The user authorization system according to claim 1, wherein the sensing means is consolidated into either the smart card or the terminal.

3. A user authorization apparatus for ubiquitous authorization management, comprising:
a sensing means for recognizing a biometric pattern from a user;

smart card configured to store at least one biometric signature of a subscriber and a public key infrastructure (PKI) certificate matching the biometric signature, verify the user by comparing the user's biometric pattern with the at least one biometric signature and generate a tunneling start signal if the user's biometric pattern matches with the at least one biometric signature; and a terminal, connected to the smart card by way of a wired or wireless communication, configured to establish a virtual private network (VPN) between the smart card and a uniform resource locator (URL) corresponding to the tunneling start signal received from the smart card, wherein the smart card is further configured to transmit an authorization information derived from the PKI certificate to the URL through the VPN, the PKI certificate includes at least one coded biometric information that is encoded from a subscriber's biometric information, the subscriber's biometric information includes at least two biometric patterns, one for an intended authorization of the subscriber and another a forced authorization of the subscriber;

the authorization information includes the subcriber's coded biometric information, and the subscriber's biometric signature contains the subscriber's biometric information encrypted based on the PKI certificate.

4. The user authorization apparatus according to claim 3, wherein the smart card is one among a card type, a dongle type and a USB type.

5. The user authorization apparatus according to claim 3, wherein the terminal is one among a PDA, a cell phone, a laptop computer, a desktop computer, an ATM, a KIOSK and an IPTV set-top box.

6. The user authorization apparatus according to claim 3, wherein the sensing means is consolidated into either the smart card or the terminal.

7. A smart card for ubiquitous authentication management, comprising:

a storage section for storing at least one biometric signature of a subscriber and a public key infrastructure (PKI) certificate matching the at least one biometric signature;

a biometric signature matching section for comparing a user's biometric pattern with the at least one biometric signature;

a signal transmission section for requesting that a target terminal establish a communication tunnel to a service server if the user's biometric pattern matches with the at least one biometric signature; and an authorization execution section for authorizing the user by transmitting an authentication information derived from the PKI certificate to the service server through the communication tunnel, wherein the PKI certificate includes at least one coded biometric information that is encoded from a subscriber's biometric information, the subscriber's biometric information includes at least two kinds of biometric patterns, one for an intended authorization of the subscriber and another for a forced authorization of the subscriber, the authorization information includes the at least one coded biometric information, and the biometric signature contains the subscriber's biometric information encrypted based on the PKI certificate.

8. The smart card according to claim 7, wherein the biometric information includes at least one among a fingerprint pattern, a vascular pattern, a voice pattern, a iris pattern and a palm pattern.

9. The smart card according to claim 7, further comprising a biometric sensor for recognizing a biometric pattern from the user.

10. The smart card according to claim 7, wherein the user's biometric pattern is received from the target terminal.

11. The smart card according to claim 7, further comprising a software based one-time password (OTP) generator for generating an OTP, wherein the authentication information includes the OTP and the PKI certificate.

12. A user authorization method in a smart card for ubiquitous authentication management, comprising:

comparing a user's biometric pattern with at least one biometric signature of a subscriber stored in the smart card;

requesting that a target terminal establish a communication tunnel with a service server if the user's biometric pattern matches with the at least one biometric signature; and transmitting, to the target terminal, an authentication information derived from the PKI certificate when the communication tunnel is established with the service server, wherein the PKI certificate includes at least one coded biometric information and is matching the subscriber's biometric signature, the subscriber's biometric signature contains the subscriber's biometric information encrypted based on the PKI certificate, the subscriber's biometric information includes at least two biometric patterns, one for an intended authorization of the subscriber and another for a forced authorization of the subscriber, and the authentication information includes the subscriber's coded biometric information.

13. The user authorization method according to claim 12, further comprising recognizing a biometric pattern from the user.

14. The user authorization method according to claim 12, further comprising receiving the user's biometric pattern from the target terminal.

* * * * *